US011151356B2

(12) United States Patent
Flanagan et al.

(10) Patent No.: US 11,151,356 B2
(45) Date of Patent: Oct. 19, 2021

(54) USING CONVOLUTION NEURAL NETWORKS FOR ON-THE-FLY SINGLE PARTICLE RECONSTRUCTION

(71) Applicant: FEI Company, Hillsboro, OR (US)

(72) Inventors: John Flanagan, Hillsboro, OR (US); Erik Franken, Nuenen (NL); Maurice Peemen, Rijsbergen (NL)

(73) Assignee: FEI Company, Hillsboro, OR (US)

( * ) Notice: Subject to any disclaimer, the term of this patent is extended or adjusted under 35 U.S.C. 154(b) by 37 days.

(21) Appl. No.: 16/287,982

(22) Filed: Feb. 27, 2019

(65) Prior Publication Data

US 2020/0272805 A1 Aug. 27, 2020

(51) Int. Cl.
*G06K 9/00* (2006.01)
*G06K 9/62* (2006.01)
*G06N 3/08* (2006.01)
*G06T 7/00* (2017.01)
(Continued)

(52) U.S. Cl.
CPC ......... *G06K 9/00147* (2013.01); *G01N 15/10* (2013.01); *G06K 9/00201* (2013.01); *G06K 9/6227* (2013.01); *G06K 9/6257* (2013.01); *G06K 9/6262* (2013.01); *G06N 3/08* (2013.01); *G06T 7/0012* (2013.01); *G06T 11/003* (2013.01); *G06T 2207/10056* (2013.01);
(Continued)

(58) Field of Classification Search
CPC ......... G06K 9/00147; G06K 2209/403; G06K 9/00201; G06K 9/6227; G06K 9/6257; G06K 9/6262; G06T 11/003; G06T 7/0012; G06T 2207/20084; G06T 2207/20081; G06T 2207/10056; G01N 15/10; G01N 15/1475; G06N 3/08
See application file for complete search history.

(56) References Cited

U.S. PATENT DOCUMENTS

2007/0172113 A1* 7/2007 Sai ............................ G01J 3/46
382/159
2009/0274375 A1* 11/2009 Kavanau .................. G06T 5/002
382/224
(Continued)

OTHER PUBLICATIONS

Dror, "Single-particle electron microscopy (cryo-electron microscopy)," CS/CME/BioE/Biophys/BMI 279 lecture, pp. 1-62 (Nov. 16 and 28, 2017).
(Continued)

*Primary Examiner* — Randolph I Chu
(74) *Attorney, Agent, or Firm* — Klarquist Sparkman, LLP

(57) ABSTRACT

Convolutional neural networks (CNNs) of a set of CNNs are evaluated using a test set of images (electron micrographs) associated with a selected particle type. A preferred CNN is selected based on the evaluation and used for processing electron micrographs of test samples. The test set of images can be obtained by manual selection or generated using a model of the selected particle type. Upon selection of images using the preferred CNN in processing additional electron micrographs, the selected images can be added to a training set or used as an additional training set to retrain the preferred CNN. In some examples, only selected layers of the preferred CNN are retrained. In other examples, two dimensional projections of based on particles of similar structure are used for CNN training or retraining.

15 Claims, 10 Drawing Sheets

(51) Int. Cl.
*G06T 11/00* (2006.01)
*G01N 15/10* (2006.01)

(52) U.S. Cl.
CPC .............. *G06T 2207/20081* (2013.01); *G06T 2207/20084* (2013.01); *G06T 2207/30168* (2013.01)

(56) References Cited

U.S. PATENT DOCUMENTS

| | | | |
|---|---|---|---|
| 2010/0003715 A1* | 1/2010 | Pellegrino | G01N 21/6486 435/35 |
| 2011/0090247 A1* | 4/2011 | Taki | G01N 15/147 345/620 |
| 2011/0090500 A1* | 4/2011 | Hu | G01N 15/1475 356/337 |
| 2012/0076349 A1* | 3/2012 | Manri | G01N 15/1459 382/100 |
| 2016/0069856 A1* | 3/2016 | Gorritxategi | G01N 33/2888 356/70 |
| 2016/0370274 A1* | 12/2016 | Rowe | G01V 8/02 |
| 2018/0322327 A1* | 11/2018 | Smith | G06N 5/046 |
| 2018/0322634 A1* | 11/2018 | Zimmerman | G06K 9/6267 |
| 2018/0322660 A1* | 11/2018 | Smith | G06K 9/6267 |
| 2019/0147621 A1* | 5/2019 | Alesiani | G06T 7/50 382/190 |
| 2019/0360915 A1* | 11/2019 | Foster | G01N 15/0227 |

OTHER PUBLICATIONS

Wang et al., "DeepPicker: A deep learning approach for fully automated particle picking in cryo-EM," *Journal of Structural Biology*, 195:325-336 (2016).

Xiao et al., "A fast method for particle picking in cryo-electron micrographs based on fast R-CNN," *AIP Conference Proceedings*, 1836:020080-1-020080-11 (2017).

Zhu et al., "A deep convolutional neural network approach to single-particle recognition in cryo-electron microscopy," *BMC Bioinformatics*, 18:1-10 (2017).

Extended European Search Report from European Patent Application No. 20185080.7, dated Dec. 16, 2020, 8 pages.

Potocek et al., "Sparse Scanning Electron Microscopy Data Acquisition and Deep Neural Networks for Automated Segmentation in Connnectomics," *Microscopy and Microanalysis*, 26:403-412 (2020).

* cited by examiner

USING CONVOLUTION NEURAL NETWORKS FOR ON-THE-FLY SINGLE PARTICLE RECONSTRUCTION

FIELD

The disclosure pertains to particle selection such as in cryo-electron tomography of biological particles.

BACKGROUND

Electron microscopy has been used to investigate the structure of biological particles. Typically, particle specimens are maintained at cryogenic temperatures, and images are obtained with low electron beam doses (although images can be obtained using ions or other charged particle beams (CPBs)) to avoid altering the specimens. As a result, images containing such particles have low contrast and low signal to noise ratio, and it is difficult to reliably select examples of the intended particles in the images for use in structure determinations. In many cases, users select and investigate a large number of particles in a tedious, time consuming manual process. In other cases, convolutional neural networks (CNNs) have been used to identify the desired particles. Unfortunately, training a CNN typically requires identifying and/or categorizing hundreds or thousands of particles to produce a suitable training set for establishing a particular CNN. Even if a suitable training set is available for a particular particle, the development of a CNN for identification and classification of different particles remains difficult.

SUMMARY

Methods comprise extracting, from a plurality of particle images, a subset of particle images using an at least partially trained artificial neural network. The particle images of the subset of particle images are classified to define at least one group of like particle images. Three-dimensional (3D) reconstructions of a particle are obtained at least based on the classified particle images and the at least one group of like particle images. A training set of particle images associated with the at least partially trained artificial neural network is updated based on the classified particle images or projections of the 3D reconstruction of the particle. Typically, the training set is updated immediately in response to classifications or groupings of particle images. In some examples, the updating the training set of particle images includes annotating each of the particle images of the subset for quality, and the training set of particle images is updated based on the annotated particle images. In particular examples, the annotations comprise accept or reject characterizations. In further examples, the updating of the training set of particle images includes scoring each of the classified particle images for quality, weighting each of the classified particle images with learning weights, and providing the scored and weighted classified particle images to the training set of particle images. In other alternatives, some or all of the classified particle images are annotated with accept or reject characterizations.

According to other embodiments, respective 3D quality matching scores are applied to each of the extracted particle images based on two-dimensional (2D) projections of the 3D reconstruction of the particle, wherein each 2D projection of the 3D reconstruction is associated with a different orientation of the 3D reconstruction. The extracted particle images and their respective 3D quality matching scores are then provided to the training set of particle images. In further examples, a respective 2D quality matching score is applied to each of the extracted particle images based on 2D group averages of self-similar particles and the extracted particle images and their respective 2D quality matching scores are provided to the training set of particle images. In some cases, the training set of particle images is updated by applying a respective 3D quality matching score to each of the extracted particle images based on 2D projections of the 3D reconstruction of the particle, wherein the 2D projections of the 3D reconstruction are associated with at least two different orientations of the 3D reconstruction. The extracted particle images and their respective 3D quality matching scores are provided to the training set of particle images.

In still further examples, updating the training set of particle images includes generating one or more synthetic particle images of an example particle based on the 3D reconstruction of the particle and providing the one or more synthetic particle images to the training set of particle images. In typical examples, the synthetic particle images are annotated and learning weights are applied. In still further embodiments, the training set is updated by generating groups of like particle images and providing the groups of like particle images to the training set of particle images. In other examples, the training set is updated by generating synthetic particle images of an example particle based on 3D reconstructions or 3D models from an external source and providing the synthetic images to the training set of particle images. In other examples, the artificial neural network is retrained using at least the updated training set. The retrained artificial neural network is applied to extract a second subset of particle images from at least the plurality of particle images. The artificial neural network can be selected from a plurality of pre-trained artificial neural networks based on one of a priori information about the particle and settings of a transmission electron microscope used to obtain the plurality of particle images. In still other examples, the plurality of particle images are selected from one or more micrographs and the selecting the plurality of particle images and extracting the subset of particle images are performed concurrently. In additional examples, the updating the training set of particle images is initiated in response to the classification of the particle images or generation of the projections of the 3D reconstruction.

According to some examples, methods comprise, in one or more computer-readable media, storing definitions for a plurality of trained convolutional neural networks (CNNs) associated with particle picking. In other examples, Regional CNNs (R-CNNs), Fully Convolutional Networks, Plain Vanilla neural networks, multilayer perceptrons (MLPs), Recurrent Neural Networks (RCNs), U-Nets, or other machine learning technologies can be used. For convenience, examples are described with reference to CNNs. The trained CNNs are applied to a test set of images associated with a selected particle type, and based on the application of the trained CNNs to the test set, a preferred neural network (or a set of preferred neural networks) is selected for identification of particle images associated with the selected particle type. Typically the trained CNNs are initially trained with particles other than the selected particle type. In further examples, the selected preferred neural network (or set of networks) is retrained using the test set of particle images. In other examples, the preferred neural network comprises N layers, wherein N is an integer greater than 3, and the retraining comprises retraining fewer than N layers of the preferred neural network using transfer learning. In some examples, the test set of particle images is based on a model associated with the particle type. In some particular examples, the test set of particle images is obtained based on a plurality of electron micrographs selected as associated with the particle type. In other embodiments, the trained convolutional neural networks are obtained via a wide area network or are stored on one or more computer-readable media. In typical examples, one or more particle images associated with the particular particle type are selected using the preferred neural network, and in some examples, these selected particle images are used for retraining the preferred neural network. In still further examples, the test set of images associated with a selected particle type is based on a model of the selected particle. In still other examples, the test set of images is obtained by adding noise to and reducing contrast of the set of images based on the model of the selected particle.

Electron microscope systems comprise an electron column configured to produce an image of a specimen. A processor is configured to process a test set of particle images with a plurality of predefined neural networks and select a preferred neural network based on the processing. At least a portion of the image of the specimen is processed with the preferred neural network to identify particles of a selected type. In some cases, at least one computer readable medium has processor-executable instructions stored thereon for processing the portion of the image with the preferred neural network. In further examples, a communication connection is configured to receive definitions of the plurality of predefined neural networks, and couple the definitions to the processor for selection of the preferred neural network. In still other representative examples, at least one computer readable medium has stored thereon the training set. In additional embodiments, at least one computer readable medium has processor-executable instructions stored thereon for processing the portion of the image with the preferred neural network.

Systems comprise a processor and at least one computer readable medium coupled to the processor and having stored thereon processor-executable instructions for selecting a convolutional neural network for particle selection from electron micrographs. In some examples, the at least one computer readable medium has stored thereon at least one sample data set for selection of the CNN. In other examples, a communication connection is coupled to the processor to provide at least one CNN for evaluation by the processor. According to additional examples, the at least one computer readable medium has stored thereon processor-executable instructions for retraining the selected CNN for particle selection. In still other examples, the at least one computer readable medium has stored thereon processor-executable instructions for retraining only selected layers of the selected CNN.

The foregoing and other objects, features, and advantages of the disclosed technology will become more apparent from the following detailed description, which proceeds with reference to the accompanying figures.

DETAILED DESCRIPTION

Figure 1:
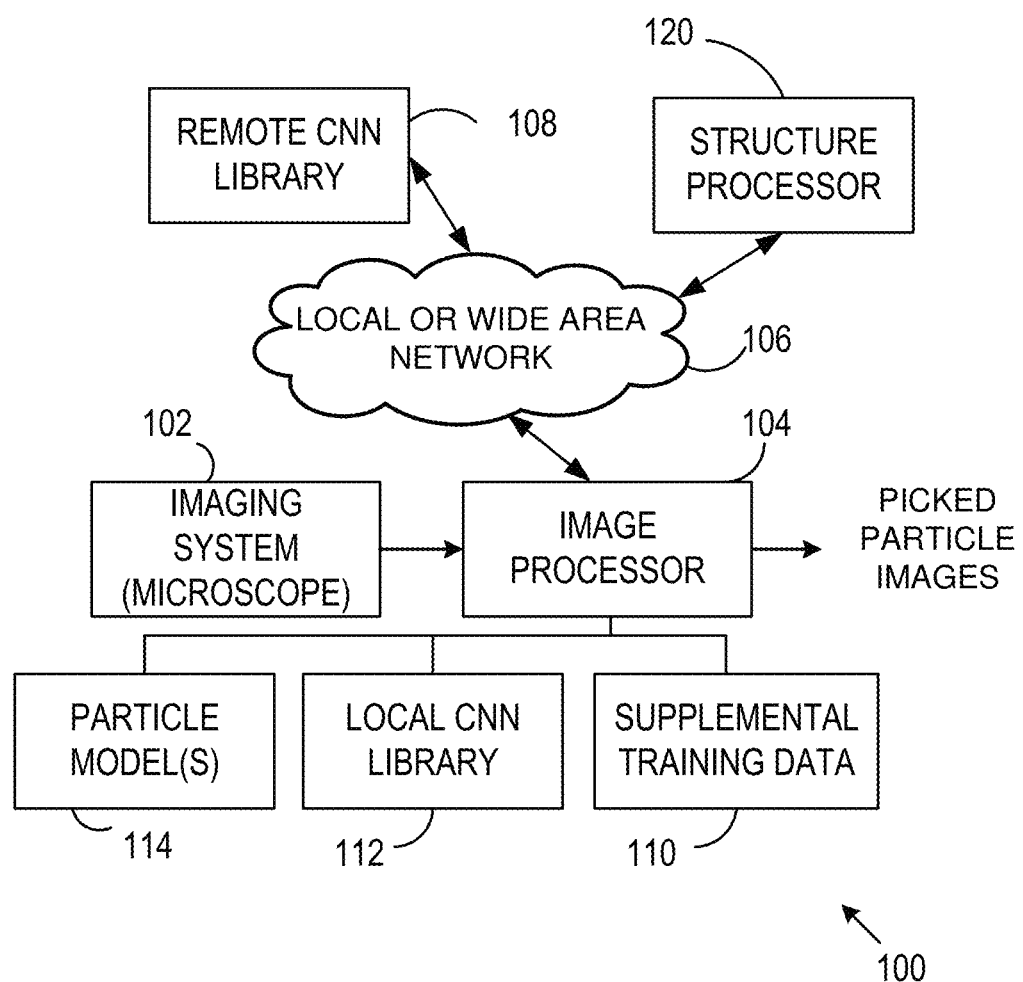
FIG. 1 illustrates a system for picking particles of interest from images produced by an electron microscope or other imaging system.

As used in this application and in the claims, the singular forms "a," "an," and "the" include the plural forms unless the context clearly dictates otherwise. Additionally, the term "includes" means "comprises." Further, the term "coupled" does not necessarily exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections. Examples are described with reference to directions indicated as "above," "below," "upper," "lower," and the like. These terms are used for convenient description, but do not imply any particular spatial orientation.

The disclosure pertains generally to cryo-electron tomography and single particle analysis. As used in the following, "particle picking" refers to selection of image portions corresponding to one or more predetermined particle types from images obtained with transmission electron microscopy. However, the disclosed approaches can be used with other types of imaging systems such as optical microscopes. In typical examples, particles of interest are biological particles that are frozen prior to imaging. As used herein, "image" refers to a visual image that is viewable by a user or a data set that is stored or storable and can be used to produce a viewable image. Such data images can be in wide variety of data formats such as JPEG, TIFF, bitmap, or other data types. In most practical examples, images are obtained as a series of image frames that can be combined. As discussed below, drift between image frames can be compensated prior to combining to form a final image. In many examples, images are two dimensional, but three dimensional images can be used as well, and the term "image" refers to two or three dimensional images such as produced by electron tomography. In some cases, the term "particle" refers to a physical particle, typically situated to be imaged with a transmission electron microscope (TEM) or other imaging system, but in some cases refers to an image data portion produced by a physical particle. In the examples below, neural networks such as convolutional neural networks (CNNs) are selected to choose image portions having a relatively high likelihood of corresponding to a physical particle of interest. However, other machine learning models using data to tune their parameters can be used such as K-nearest neighbors, support vector machines, and all types of neural networks, and not just CNNs. For convenience, TEM images and other images are referred to as "micrographs." In some cases, previously trained neural networks are referred to as being trained or retrained using additional images that can be added to a training set. Such retraining can use only the newly added images or a combination of the newly added images and images of an initial training set. For newly added images obtained by modeling, contrast can be adjusted (typically reduced) and noise added to better correspond to measured images. In some examples, a network such as a CNN (or other machine learning approach) used in particle picking is updated during processing of micrographs, and can be applied to additional particles or previously analyzed particles after the updates.

Example 1

Referring to FIG. 1, a representative system 100 for picking particles for structure determination or other applications includes an imaging system 102, typically a transmission electron microscope (TEM) that provides images of particle bearing substrates to an image processor 104 for identification of particles of an intended type and rejection of unwanted particles. A TEM or other electron microscope generally includes an electron beam source, electron optics, and an electron detection system that captures or produces an electron beam based image, referred to herein as an electron beam column. Particle identification can be challenging due to the generally limited quality of images produced by the imaging system 102. The image processor 104 can be implemented in a processor associated with the imaging system 102 or with a separate local processing device as discussed, or with a remote processor coupled to the imaging system 102 via a local or wide area network 106. As shown in FIG. 1, a local convolutional neural network (CNN) library 112 is stored in a computer readable medium that is coupled to the image processor 104 and contains processor-executable instructions and storage of values that define one or more CNNs. In addition, computer readable media 110, 114 are provided for storage of particle models associated with particles under investigation or similar particles, and supplemental training data for one or more of the CNNs stored in the CNN library 112. A single memory or storage device can be used for all of these, and some or all can be stored remotely and available via the network 106. For example, a remote CNN library 108 and a remote structure processor 120 are in communication with the image processor 104 via the network 106. The image processor 104 can also be located remotely with respect to imaging system 102. In some examples, remote CNN library specifications are transferred to local storage such as the local CNN library 112.

The image processor 104 processes images obtained with the imaging system 102 to select particle images for subsequent structural analysis or other purposes. In processing a newly targeted particle type, a training set for establishing a neural network adapted to the targeted particle type is generally not available, and one or more CNNs from the local CNN library 112 and/or the remote CNN library 108 are selected by processing a relatively small number of manually identified targeted particle images to confirm which of the available CNNs appears to provide superior results. In addition, any newly identified particle images can be added to the supplemental training data stored in the memory 110, and one or more selected library CNNs can be provided with the newly identified particle images for additional training. In some examples, the structure processor 120 is coupled via the network 106 to provide simulated images for use in a training set. Typically, the structure processor 120 produces a 3D representation of a selected particle, and in addition, can provide 2D projections of the 3D structure. Such images can include various noise contributions and contrast functions, and these images can be stored with the supplemental training data in the memory 110. For example, noise can be added to the simulated image and image contrast can be degraded to better approximate measured images.

Example 2

Figure 2:
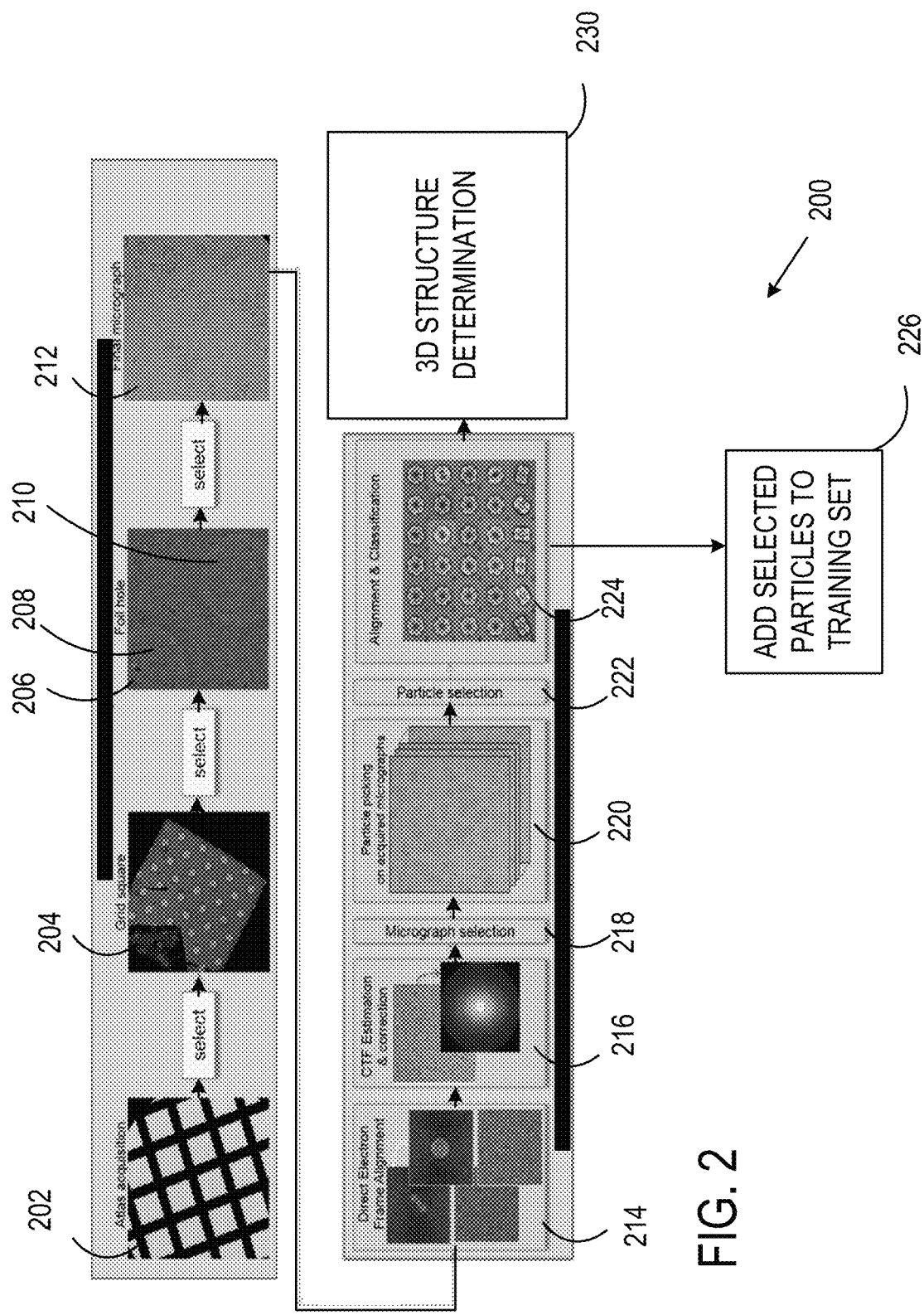
FIG. 2 illustrates a process for structure determination using particles selected with a convolutional neural network (CNN).

Referring to FIG. 2, a representative workflow 200 for particle picking includes providing a TEM grid 202 on which selected particles are distributed. In some examples, the TEM grid 202 is a so-called "holey" carbon-coated TEM support or foil that includes a plurality of holes. Particles can be retained in ice layers situated at some or all of the holes or at other locations on the grid 202. At 204, images (also referred to as "micrographs") of one or more grid regions are obtained, and at 206, a particular grid region is selected. As shown in FIG. 2, image portions 208, 210 correspond to holes in the grid 202. At 212, a final portion of the image or corresponding portions of a series of images are selected. In some cases, micrographs are not selected due to obvious defocus; ice contamination for a large part; or contains only an image of a carbon support and not hole region. With a perfect particle picking approach, manual selection of micrographs could be unnecessary. If a series of images is used, at 214 the individual images are aligned to each other to reduce the impact of drift (specimen movement). Image contrast can be adjusted at 216 using, for example, a contrast transfer function associated with image acquisition, and one or more micrographs are selected for further investigation at 218. In some cases, images that exhibit excessive drift or poor resolution, or associated with excessive ice thicknesses are rejected. Selected images 220 are processed at 222 with a suitable neural network selected and trained as described herein. Because particles images are projections of three-dimensional particle shapes into two dimensions, and the particles are generally not aligned with each other, the particle images are similarly unaligned, and at 224 the particle images are aligned and classified based on orientation. The resulting particle images can then be added to a training set at 226 for use in training an alternative neural network, or providing additional training to some or all layers of the preferred neural network, or some or all neural networks of a set of available networks. In typical examples, the selected particle images are communicated for three-dimensional structure determination at 230.

Example 3

Figure 3:
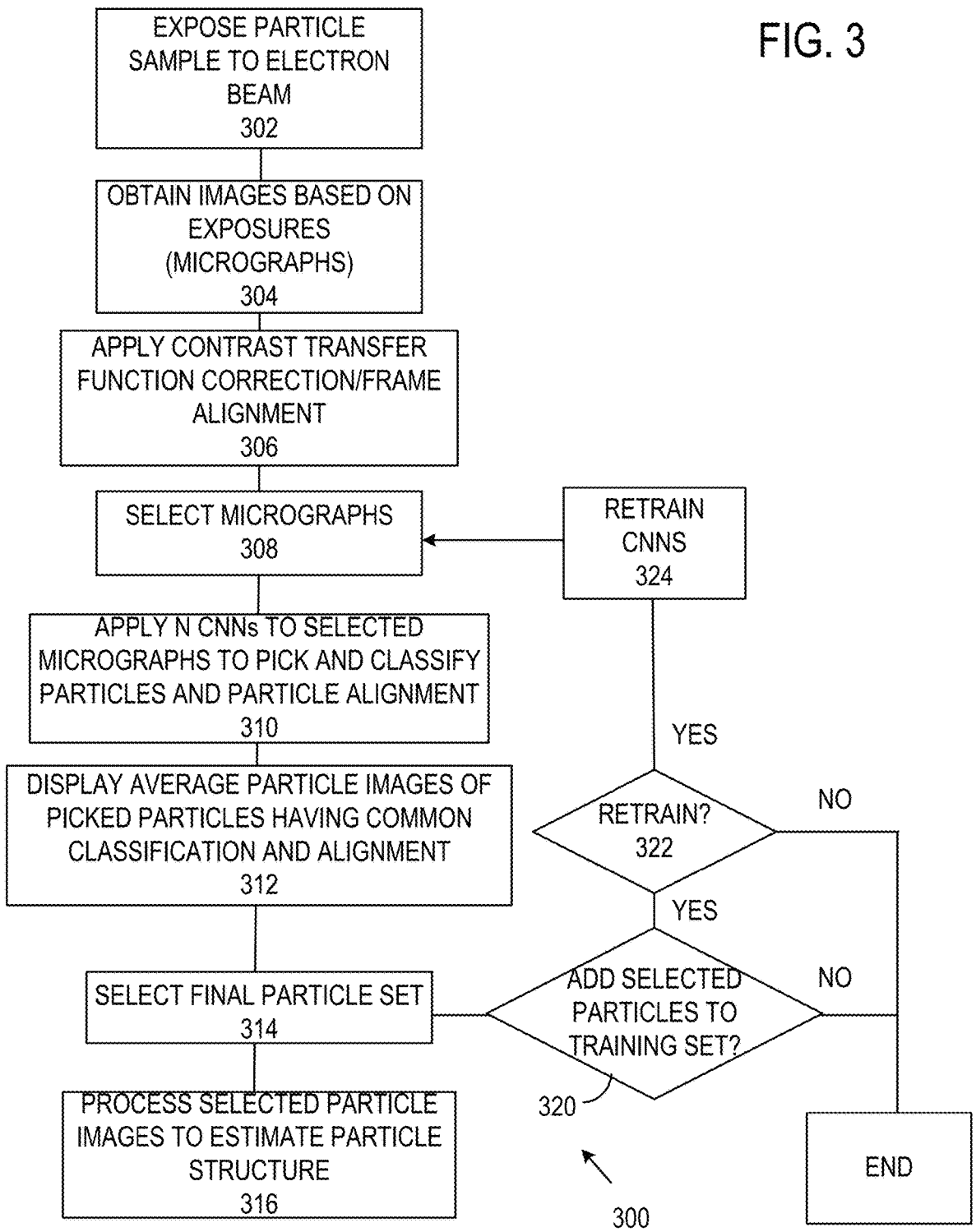
FIG. 3 illustrates a representative method of selecting particle images from micrographs and revising a CNN used for particle selection.

Referring to FIG. 3, a method 300 of selecting particles of a particular type comprises exposing one or more particle samples to an electron beam at 302 and obtaining associated images at 304. At 306, a contrast transfer function correction is applied to the images, and image frames from a series of images are aligned and combined. At 308, some images (micrographs) are selected for further processing. At 310, a plurality of CNNs are applied to the selected images to pick and classify particle images and indicate particle alignment. At 312, average particle images of particles of a common type and alignment can be displayed. At 314, a final particle set of the preferred particle type is selected, and at 316, some or all of the selected particle images can be used to estimate particle structure.

Upon selection of a final particle set at 314, the selected particle set can be used to refine the neural network used for particle selection, or to train or revise another neural network. At 320, it is determined if the final particle set is to be added to or included in a training set. If so, then at 322, it can be determined if one or more neural networks is to be retrained or revised based on the final particle set. If so, one or more neural networks are revised at 324. After revision of the CNNs, or if the final particle set is not to be used in updating a training set and the CNNs are not to be revised, additional particle samples can be exposed at 302. In addition, the revised CNN can be applied to re-pick previously selected particles. Retraining can be initiated during particle picking based on small set of examples. If one CNN appears to be a superior choice, then this CNN can be retrained, and other CNNs (which are not to be used subsequently) are not. In some examples, a set of CNNs is retrained and a superior CNN is then selected in view of the updated training set.

Example 4

Figure 4:
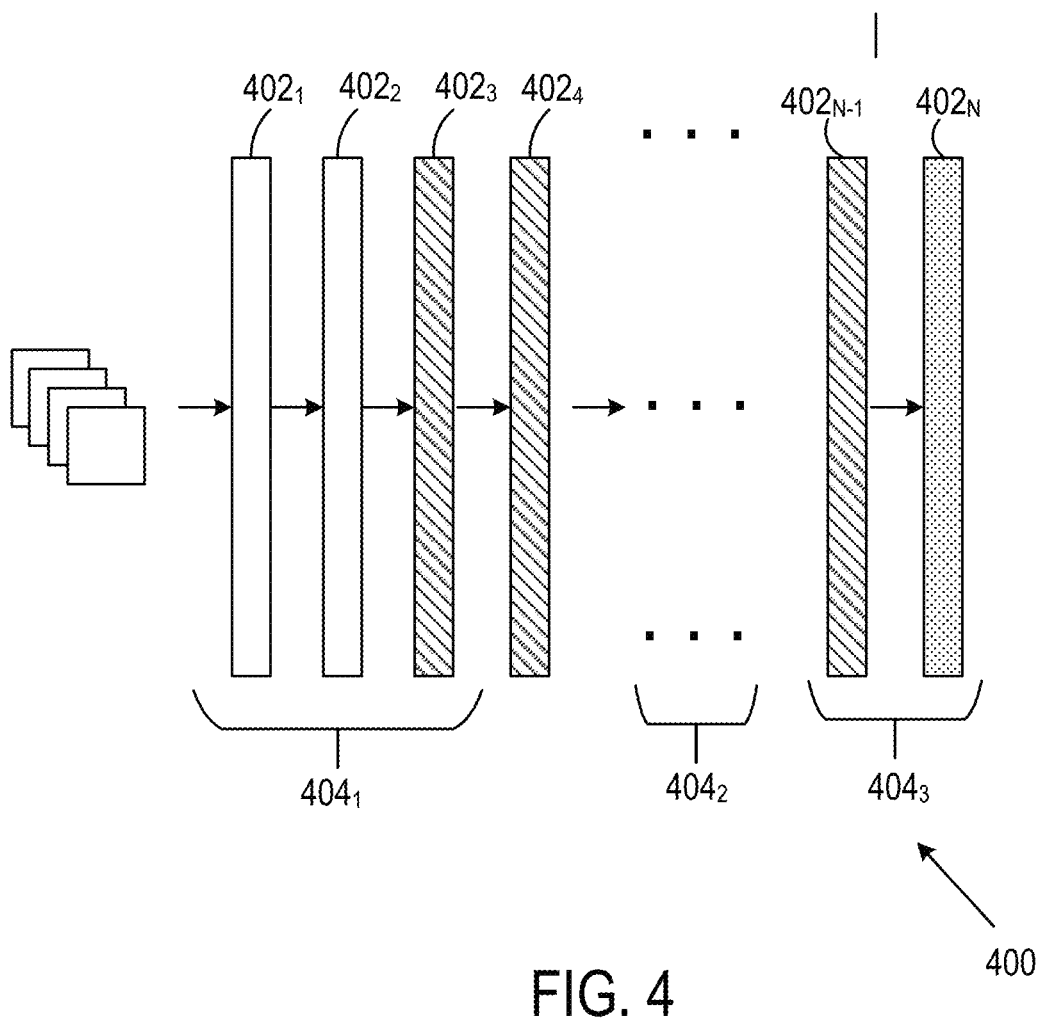
FIG. 4 illustrates a representative CNN used for particle selection.

Referring to FIG. 4, a representative neural network 400 for processing electron microscope images for selection of particles of a preferred type comprises N layers $402_1, \ldots, 402_N$, wherein N is a positive integer. In typical practical examples N is greater than 3, 5, 10, 15, or more. An initial set of layers $404_1$ of the neural network 400 typically includes one, two, or more convolutional layers such as layers $402_1$, $402_2$ (shown as boxes without shading) and an additional layer $402_3$; a final set of layers $404_3$ includes the layers $402_{N-1}$, $402_N$ (shown as boxes with shading); and an intermediate set of layers $404_2$ includes layers such as layers $402_{K-1}$, $402_K$, wherein K is a positive integer less than N. Any of these layer groupings can contain more or fewer layers of arbitrary layer types. The final layer $402_N$ is typically a fully connected layer and is referred to as a classification layer as it indicates whether or not a particle image is associated with the selected particle type. Typically, one or more initial layers are convolutional layers, but any of various layer types, activation functions, and weight values can be used. Training of a specific neural network can be based on back propagation methods. In some examples, a particular trained neural network is selected for particle picking and retrained based on additional images associated with a particle type of interest. This can be especially useful if an initial neural network used for particle picking has been trained using particle data for other particle types. As additional data for the particle type of interest is selected, such a neural network can be better tuned. In addition, in some cases, only selected layers of such a neural network are retrained. For example, the some or all of the sets $404_1$, $404_2$, $404_3$ or other layers or sets of layers can be retrained.

Example 5

Figure 5:
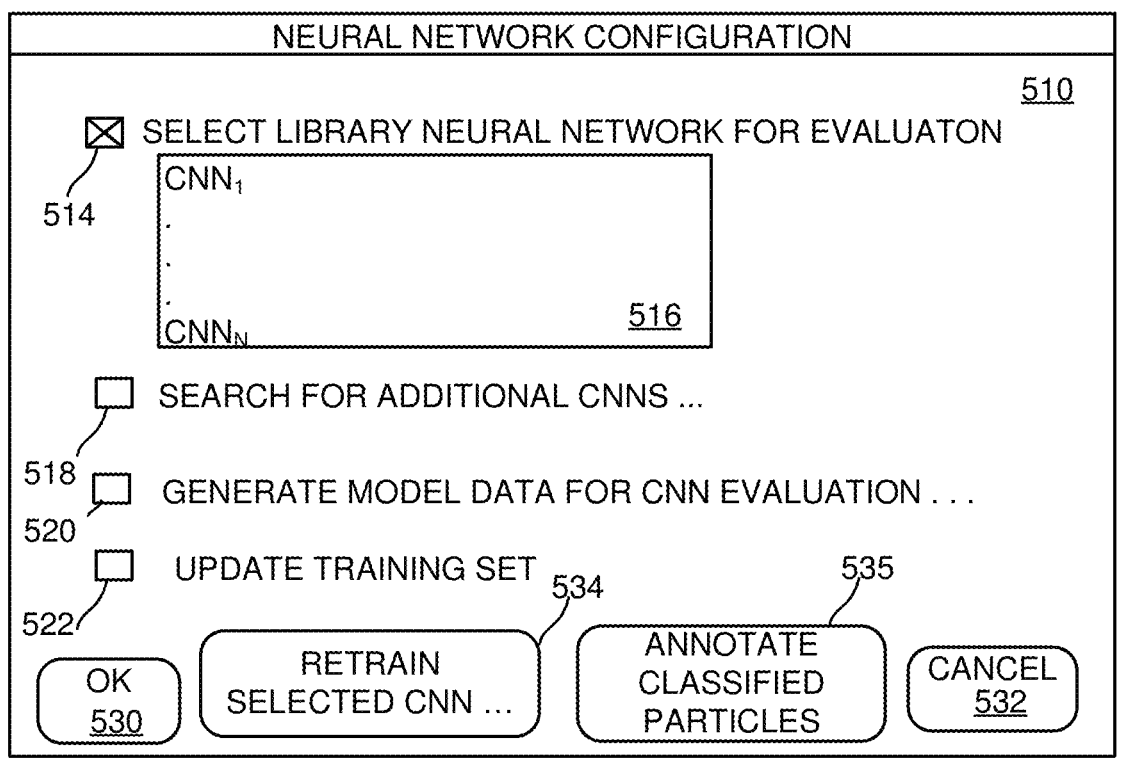
FIG. 5 illustrates a portion of a representative user interface for control of CNN selection and revision.

FIG. 5 shows a screen shot 500 of an exemplary user interface 510 for selecting, managing, and updating CNNs for particle selection. In the example shown, a checkbox 514 is provided for user indication that CNNs from a library of CNNs are to be evaluated. The CNN library can be displayed in a box 516 so that a user can select some or all for evaluation using a pointing device such as a computer mouse or touch screen. In other options, a checkbox 518 is provide for initiating a search for additional CNNs for evaluation. If selected, additional portions of the user interface 510 can indicate search locations, durations, or other search attributes. A checkbox 520 is provided to generate additional training data via modeling based on a structure of a particular particle. A checkbox 522 is provided to authorize updating of a training set with acquired or modeled results. Changes can be affirmed or discarded using selection buttons 530, 532, respectively, and one or more CNNs can be selected for additional training with a selection button 534. As discussed above, one or more CNNs can be retrained and one or more CNN layers can be selected for use in retraining. Annotations for individual particles can also be added, and a selection button 535 provides access to user interface that permits annotation and can display particle characteristics such as classifications and weights to be used in retraining. Particles annotations can be used to document incorrectly selected particles or preferred particle choices.

Example 6

Figure 6:
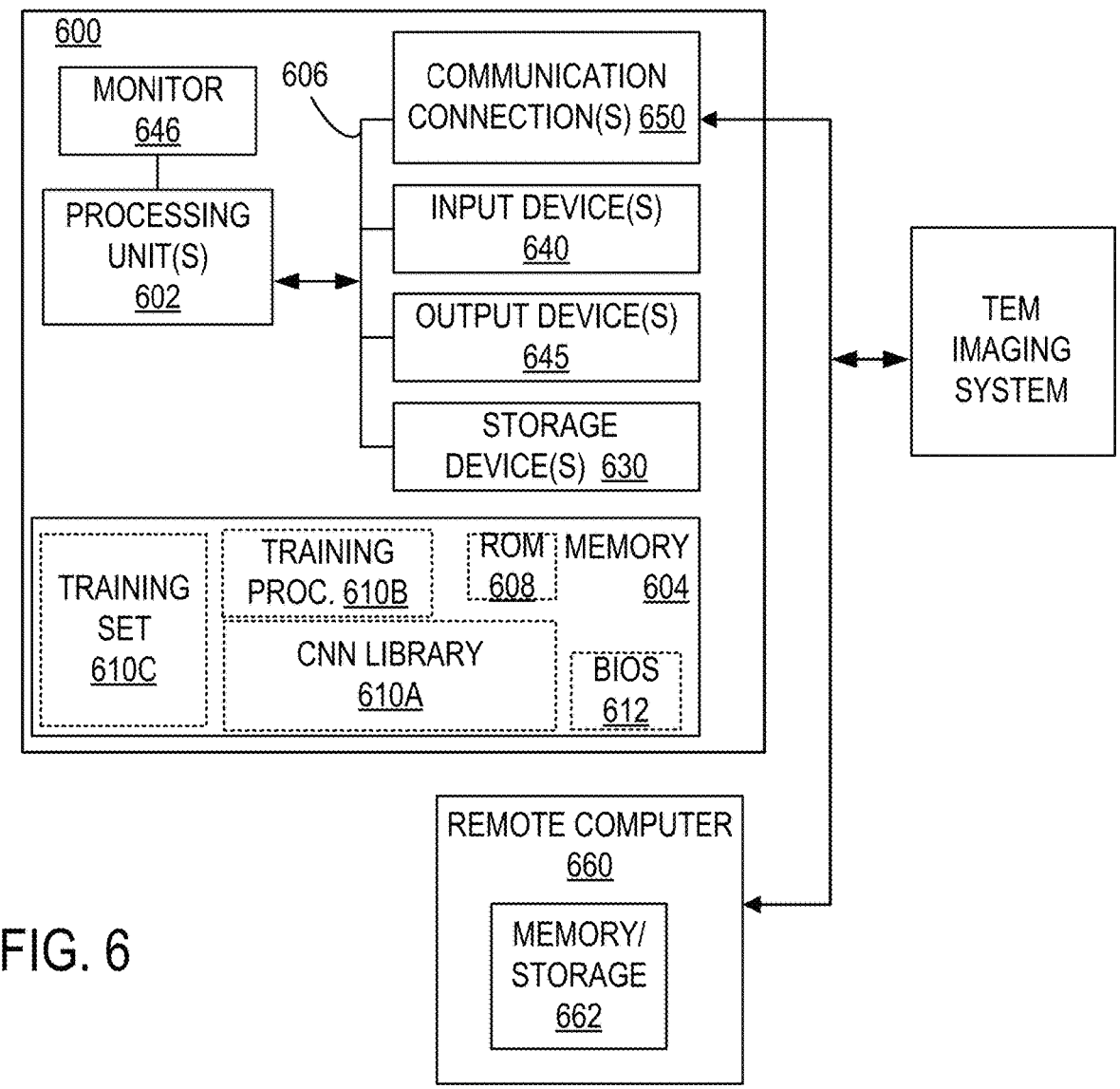
FIG. 6 illustrates a representative computing environment for using CNNs in the evaluation of micrographs to identify particles.

FIG. 6 and the following discussion are intended to provide a brief, general description of an exemplary computing environment in which the disclosed technology may be implemented. Although not required, the disclosed technology is described in the general context of computer executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network.

In a distributed computing environment, program modules may be located in both local and remote memory storage devices. In other examples, processing is based on FPGAs or other programmable or dedicated processors.

With reference to FIG. 6, an exemplary system for implementing the disclosed technology includes a general purpose computing device in the form of an exemplary conventional PC 600, including one or more processing units 602, a system memory 604, and a system bus 606 that couples various system components including the system memory 604 to the one or more processing units 602. The system bus 606 may be any of several types of bus structures including a memory bus or memory controller, a peripheral bus, and a local bus using any of a variety of bus architectures. The exemplary system memory 604 includes read only memory (ROM) 608 and random access memory (RAM) 610. A basic input/output system (BIOS) 612, containing the basic routines that help with the transfer of information between elements within the PC 600, is stored in ROM 608. The system memory 604 can includes portions 610A, 601B, 610C for storage of a CNN library, training procedures, and a training set, respectively. Alternatively, some or all of these can be obtained from a remote computer.

The exemplary PC 600 further includes one or more storage devices 630 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 606 by a hard disk drive interface, a magnetic disk drive interface, and an optical drive interface, respectively. The drives and their associated computer readable media provide nonvolatile storage of computer-readable instructions, data structures, program modules, and other data for the PC 600. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 630 including an operating system, one or more application programs, other program modules, and program data. A user may enter commands and information into the PC 600 through one or more input devices 640 such as a keyboard and a pointing device such as a mouse. Other input devices may include a digital camera, microphone, joystick, game pad, satellite dish, scanner, or the like. These and other input devices are often connected to the one or more processing units 602 through a serial port interface that is coupled to the system bus 606, but may be connected by other interfaces such as a parallel port, game port, or universal serial bus (USB). A monitor 646 or other type of display device is also connected to the system bus 606 via an interface, such as a video adapter. Other peripheral output devices, such as speakers and printers (not shown), may be included.

The PC 600 may operate in a networked environment using logical connections to one or more remote computers, such as a remote computer 660. In some examples, one or more network or communication connections 650 are included. The remote computer 660 may be another PC, a server, a router, a network PC, or a peer device or other common network node, and typically includes many or all of the elements described above relative to the PC 600, although only a memory storage device 662 has been illustrated in FIG. 6. The personal computer 600 and/or the remote computer 660 can be connected to a logical a local area network (LAN) and a wide area network (WAN). Such networking environments are commonplace in offices, enterprise wide computer networks, intranets, and the Internet.

When used in a LAN networking environment, the PC 600 is connected to the LAN through a network interface. When used in a WAN networking environment, the PC 600 typically includes a modem or other means for establishing communications over the WAN, such as the Internet. In a networked environment, program modules depicted relative to the personal computer 600, or portions thereof, may be stored in the remote memory storage device or other locations on the LAN or WAN. The network connections shown are exemplary, and other means of establishing a communications link between the computers may be used.

Example 7

Figure 7:
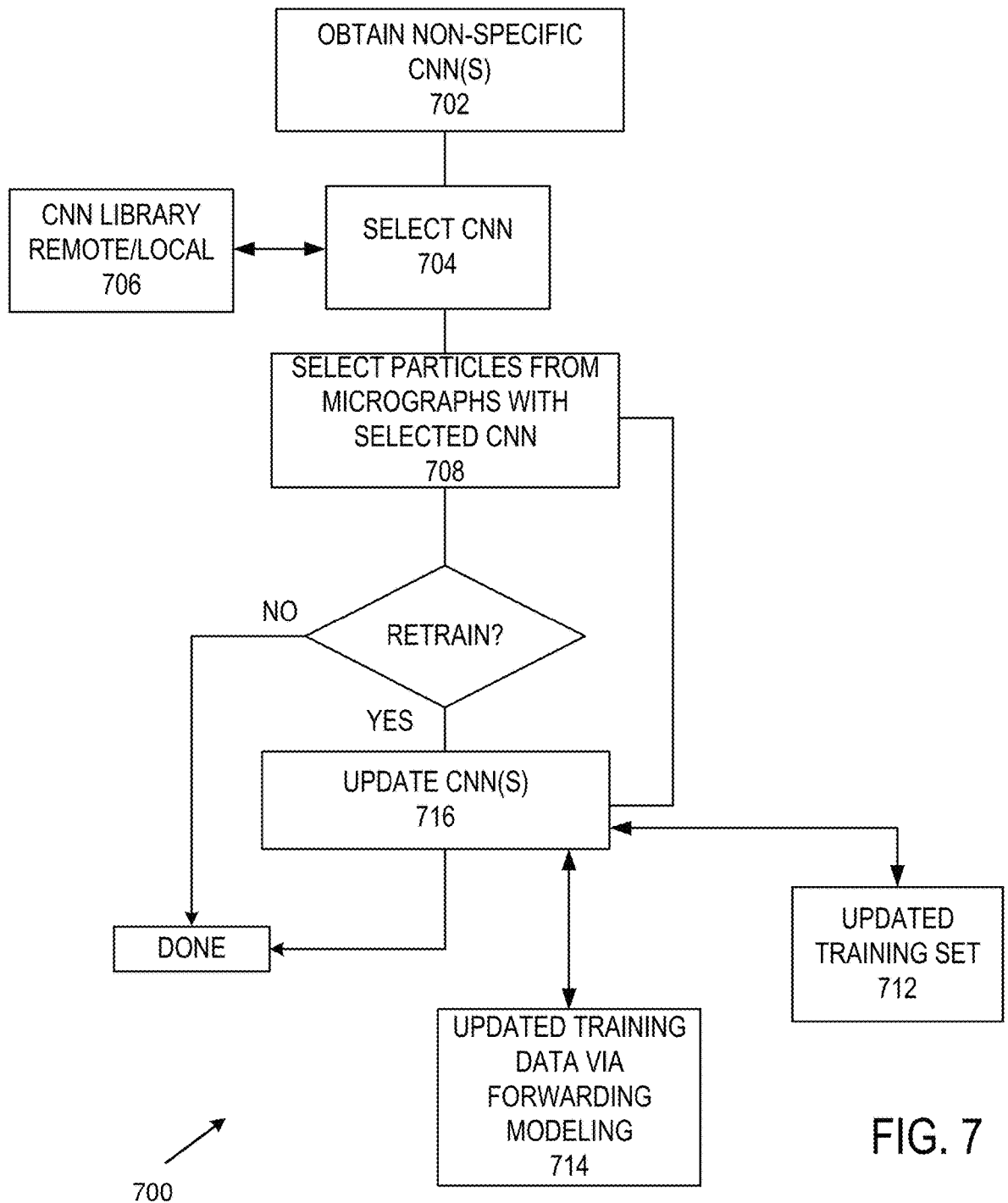
FIG. 7 illustrates a representative method of updating a selected CNN based on model data or measured data.

Referring to FIG. 7, a method 700 of providing a neural network for picking particles of a particular type includes obtaining one or more CNNs that need not have been trained based on the particular particle type at 702. One (or more) of the library CNNs can be selected as 704 based on processing of a set of particle images associated with the particular particle type. A CNN library or library server 706 can be configured to store candidate CNNs locally or retrieve candidate CNNs via a network. Particles are selected from acquired micrographs at 708, and, if desired, the selected particles can be added to an updated training set stored in a memory 712. In some cases, the updated training set is remote from the imaging system used to acquire particle-containing images (such as TEM micrographs). Alternatively, particle modeling can be used to generate additional training set data using a server/memory 714 which can be local or remote from a TEM used to acquire micrographs. If an updated CNN or an updated selection of CNN(s) is intended at 716, the updated training set and/or the model data is used at 716. An updated CNN (or newly selected CNN) based on training with selected particles can be used for evaluation of previously unexamined micrographs as well as previously used micrographs. The method 700 can be carried out during evaluation of additional micrographs, and updates can be used as soon as available.

Example 8

Figure 8:
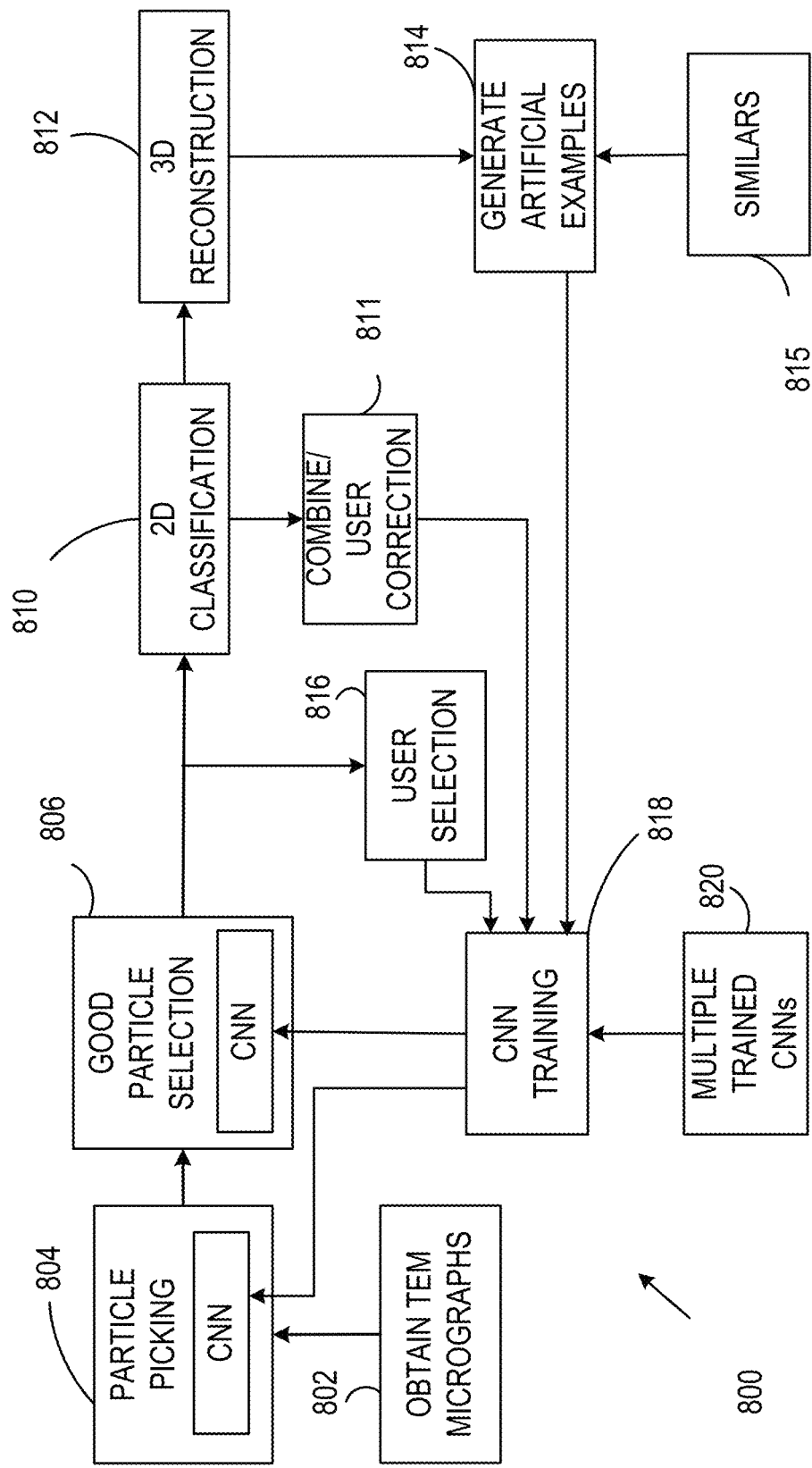
FIG. 8 illustrates a representative method that includes "on the fly" processing.

Referring to FIG. 8, a representative method 800 includes obtaining TEM micrographs as 802, and selecting particle images from the micrographs as 804. Particle images can be selected with a CNN, other NN, or other machine learning method, if desired. At 806, the selected particle images are processed with, for example, a CNN, other NN, or other machine learning method to select "good" particles, i.e., provide a superior particle set than that obtained at 804. The CNNs or other approaches used at 804, 806 can be the same or different. At 810, the selected particle images are classified based on orientation and then provided for 3D reconstruction at 812. The 3D reconstruction can be used to provide additional 2D projections at 814 that can be used as a training set or added to a training set for CNN training at 818. In addition, after good particle selection at 806, some or all of the selected particles can be identified by a user at 816 for addition to a training set or to form a training set. After classification at 810, particles having a common classification can be combined or user corrections applied at 811, and the combined particles provided for CNN training at 818. As shown in FIG. 8, multiple trained CNNs can be provided. Some or all of these CNNs can be evaluated as additional particle data or model data becomes available, and some or all of these CNNs (even those not selected) can be retrained using the additional particle or model data. At least steps 811, 814, 816 can be executed "on the fly" as additional micrographs are being processed. In some alternatives, structures of particles similar to those under investigation can be selected at 815, and artificial examples based on one or more selected "similar" can be used to generate artificial examples (2D projections) at 814.

As discussed above with reference to FIG. 8, particle images can be selected from TEM micrographs or other two dimensional images and processed as shown. However, particle images can also be selected as portions of 3D images such as electron tomography images or other 3D images for processing. For 3D image portions, 3D classification based on orientation is used instead of 2D classification at 810 and 3D reconstruction at 812 is unnecessary.

Example 9

Figure 9:
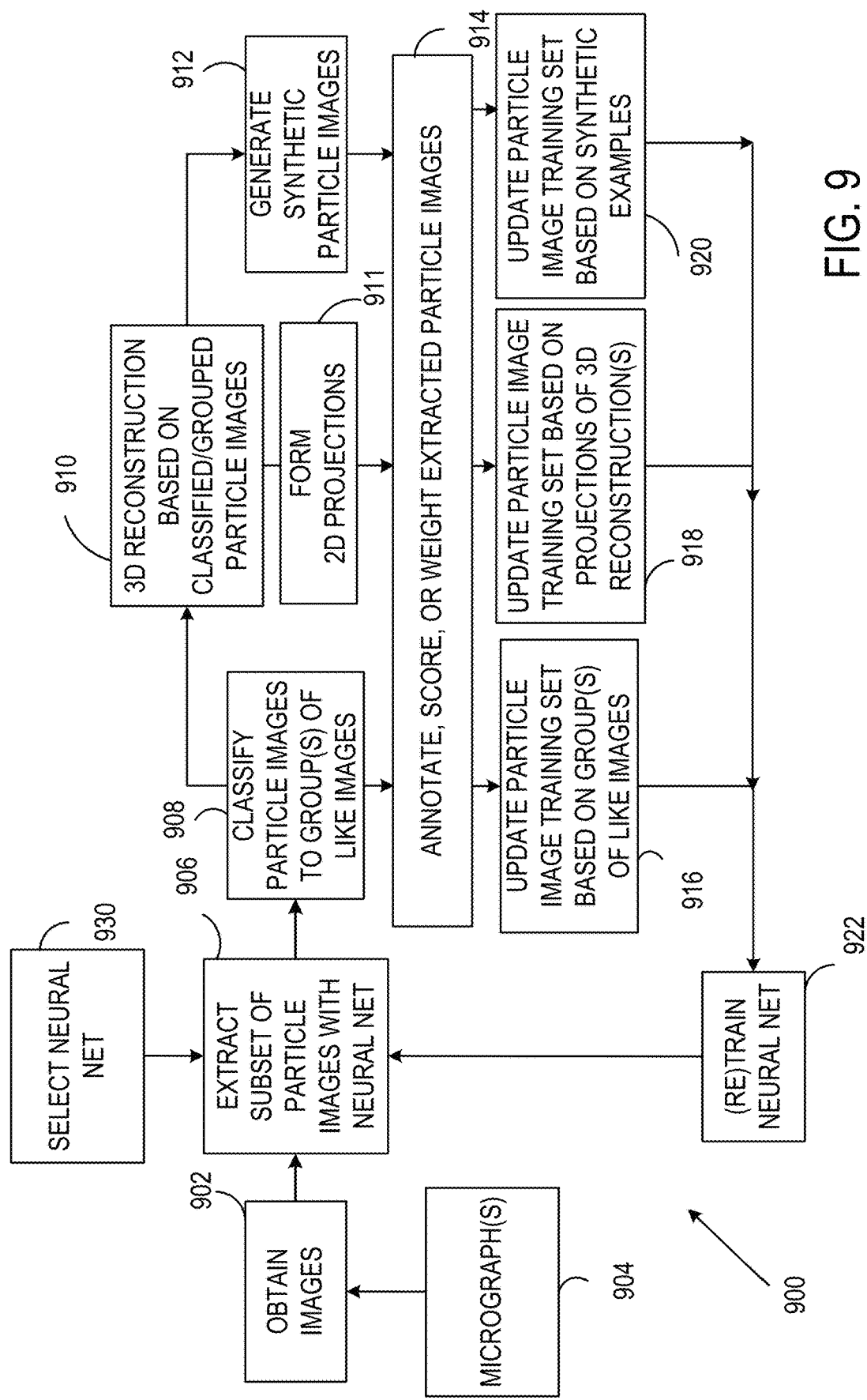
FIG. 9 illustrate a representative method of particle picking.

Referring to FIG. 9, a method 900 includes obtaining one or more micrographs or other images at 902 from a set of micrographs or other images 904. At 906, a subset of particle images is extracted with a neural network that is selected to preferentially identify particle images from image portions. Multiple particle images can be obtained from a single micrograph or multiple micrographs. The neural network used at 806 can be trained with particle data for other types of particles or otherwise trained, and can be referred to as partially trained to note that training has been performed without particle images for a particle type selected for investigation. At 908, extracted particle images can be classified based on, for example, particle orientation to produce groups of like particle images. Particle orientation in micrographs is typically uncontrolled, and alignment of particle images can improve subsequent structure determinations. Extracted particle images can be associated with two or more orientation groups, or with groups based on other particle characteristics. For example, if the set of micrographs or other images 904 is associated with multiple particle types, groups (and orientation sub-groups) corresponding to the multiple particle types and orientations can be formed.

At 910, the extracted, classified and grouped particle images can be used to produce a 3D reconstruction of the particle, and at 911, one or more 2D projections of the particle are formed using the 3D reconstructions. These 2D projections correspond to particle images that can be used to retrain the neural network used in extracting particle images at 906. In addition, at 912, additional particle images can be produced based on a model of particle structure. Such particle images are referred to as "synthetic" to distinguish from particle images obtained from micrographs or other particle measurements.

Any of the classified particle images, 2D reconstructions, or synthetic particle images can be annotated, scored or weighted at 914. For example, a particle image can be noted as corresponding to a particle of interest and labeled/annotated for acceptance as such, while other particle images can be noted as not corresponding to a particle of interest and annotated for rejection. Particle images noted for acceptance or rejection can be used for additional neural network training/retraining at 922. As shown in FIG. 9, a training set can be updated based on classified particle images and groups of classified particle images at 916, with or without annotations, scores, or weights. Similarly, at 918, particle images based on 2D projections with or without annotations, scores, or weights can be used to update the training set. Synthetic images can be used at 920 to update the training set, with or without annotations, scores, or weights. As shown in FIG. 9, these training set updates can be executed concurrently, sequentially, or simultaneously or otherwise. In one example, the training set is updated immediately as additional particle images or associated annotations, scores, or weights are available. Typically, such updates are generated automatically as each or groups of updates are available. One or more of the updates indicated at 916, 918, 920 can be automated, be immediately executed, or used in batch mode as multiple updates become available. Neural network retraining (or neural network selection) can be automatic, immediate, or delayed until multiple updates or a batch of updates becomes available. In typical examples, the neural network is retrained at 922 automatically in response to one or more updates. In preferred examples, retraining occurs substantially immediately in response to a training set update. Typically, as additions (or deletions) are made to the training set, retraining is initiated so that the neural network used at 906 is iteratively updated during particle image processing. In some examples, in conjunction with initiation of some or all neural network updates, a suitable neural network can be selected from a set of choices at 930. Thus, if desired, the neural network can be replaced.

In some examples, one or more micrographs or one or more sets of particle images are iteratively processed as a neural network used for particle selection is refined by retraining based on updates to a training set. Iterations can be automatic so that each or selected particle images can be processed with a common neural network configuration, but as modified in view of different training sets. Iterative processing can be halted or executed at predetermined times or time intervals as well, if desired.

3D image portions associated with particle selection can be processed as well. For example, images produced with electron tomography images can be used, and image portions associated with particles selected. Because the image portions to be processed are 3D portions, 3D reconstruction at 910 is not required, and typically 2D projections such as formed at 911 are not used as processing is based on 3D image portions. Neural network training and training sets also use 3D images.

Example 10

Figure 10:
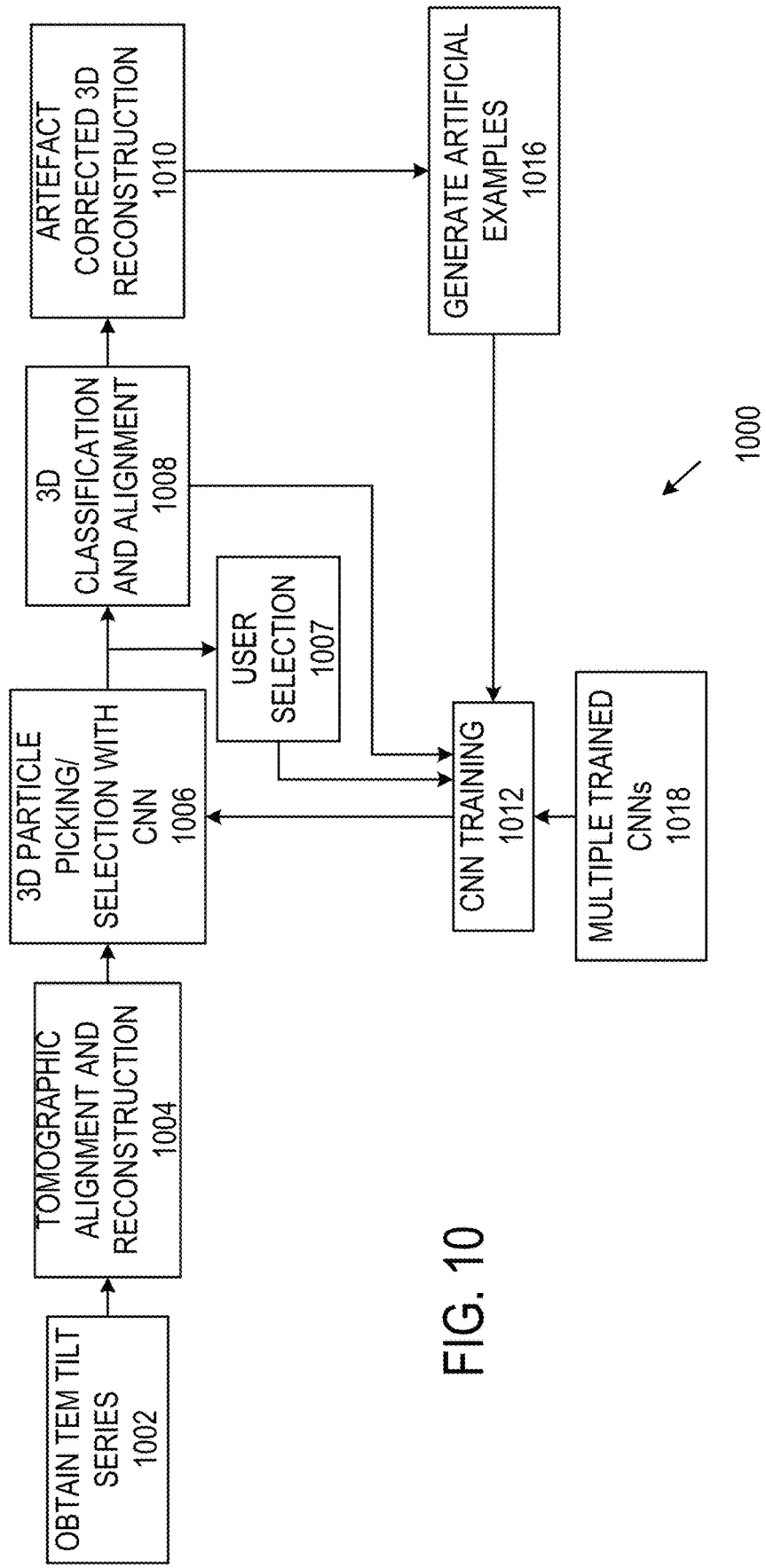
FIG. 10 illustrates particle picking and structure determination based on tomographic reconstructions.

The preceding examples are based on two dimensional images, but as shown in FIG. 10, volume (i.e., three dimensional) images can be similarly processed to select particles and/or estimate structures. Referring to FIG. 10, a method 1000 includes obtaining tilt series of TEM images at 1002. At 1004, the tilt series of images is aligned and processed to produce a tomographic reconstruction. Tilt-series alignment is typically associated with transmission electron tomography in which projections to be combined are obtained by tilting a specimen about an axis. For accurate tomographic reconstruction, tilt angles with respect to a tilt axis should be used, and any variations in orientation compensated or eliminated in tilt-series alignment.

At 1006, one or more neural networks is used to select tomographic image portions that are associated with particles to be investigated. At 1007, some, all, or none of these particles can be selected for use in additional CNN training at 1012. One or more CNNs can be trained or retrained using the associated image portions. At 1008, tomographic image portions are classified and aligned, and some, all, or none of these image portions can be supplied for use in additional CNN training at 1012. At 1010, classified and aligned image portions are used to produce artefact-corrected 3D reconstructions. Typically, effects due to a blind region or "missing wedge" are compensated. The reconstructions can be used at 1016 to generate artificial examples for use in CNN training at 1012. The one or more CNNs to be used at 1006 can be supplied at 1018 from a set of previously trained CNNs. As discussed above, the prior CNN training can be based on image portions associated with other types of particles, but that may appear to be similar to the particles of interest.

It will be recognized that the illustrated embodiments can be modified in arrangement and detail without departing from the principles of the disclosure. For instance, elements of the illustrated embodiment shown in software may be implemented in hardware and vice-versa. Also, the technologies from any example can be combined with the technologies described in any one or more of the other examples. We therefore claim as our invention all subject matter that comes within the scope and spirit of the appended claims

We claim:

1. A method, comprising:
   extracting, from a plurality of particle images, a subset of particle images using an at least partially trained artificial neural network;
   classifying particle images of the subset of particle images to define at least one group of like particle images;
   forming a three-dimensional (3D) reconstruction of a particle at least based on the classified particle images and the at least one group of like particle images;
   updating a training set of particle images based on the classified particle images or projections of the 3D reconstruction of the particle, wherein the training set is associated with the at least partially trained neural network and is updated automatically in response to one or more of classifying at least one particle image and defining at least one group of like particle images, wherein the updating the training set of particle images includes:
   generating one or more synthetic particle images of an example particle based on the 3D reconstruction of the particle;
   providing the one or more synthetic particle images to the training set of particle images;
   annotating each of the synthetic particle images; and
   applying learning weights to each of the synthetic particle images.

2. The method of claim 1, wherein each of the particle images of the subset is annotated for quality, wherein the training set of particle images is updated based on the annotated particle images.

3. The method of claim 2, wherein the annotations comprise accept or reject characterizations.

4. A method, comprising:
   extracting, from a plurality of particle images, a subset of particle images using an at least partially trained artificial neural network;
   classifying particle images of the subset of particle images to define at least one group of like particle images;
   forming a three-dimensional (3D) reconstruction of a particle at least based on the classified particle images and the at least one group of like particle images; and
   updating a training set of particle images based on the classified particle images or projections of the 3D reconstruction of the particle, wherein the training set is associated with the at least partially trained neural network and is updated automatically in response to one or more of classifying at least one particle image and defining at least one group of like particle images, wherein the updating of the training set of particle images includes:
   scoring each of the classified particle images for quality;
   weighting each of the classified particle images, wherein the weights are learning weights; and
   providing the scored and weighted classified particle images to the training set of particle images.

5. The method of claim 4, further comprising annotating each of the classified particle images with accept or reject characterizations.

6. The method of claim 4, further comprising:
   applying respective 3D quality matching scores to each of the extracted particle images based on two-dimensional (2D) projections of the 3D reconstruction of the particle, wherein each 2D projection of the 3D reconstruction is associated with a different orientation of the 3D reconstruction; and
   providing each of the extracted particle images and their respective 3D quality matching scores to the training set of particle images.

7. The method of claim 4, further comprising:
   applying a respective 2D quality matching score to each of the extracted particle images based on two-dimensional (2D) group averages of self-similar particles; and
   providing each of the extracted particle images and their respective 2D quality matching scores to the training set of particle images.

8. A method, comprising:
   extracting, from a plurality of particle images, a subset of particle images using an at least partially trained artificial neural network;
   classifying particle images of the subset of particle images to define at least one group of like particle images;
   forming a three-dimensional (3D) reconstruction of a particle at least based on the classified particle images and the at least one group of like particle images; and
   updating a training set of particle images based on the classified particle images or projections of the 3D reconstruction of the particle, wherein the training set is associated with the at least partially trained neural network and is updated automatically in response to one or more of classifying at least one particle image and defining at least one group of like particle images, wherein updating the training set of particle images includes:
   applying a respective 3D quality matching score to each of the extracted particle images based on two-dimensional (2D) projections of the 3D reconstruction of the particle, wherein the 2D projections of the 3D reconstruction are associated with at least two different orientations of the 3D reconstruction; and
   providing each of the extracted particle images and their respective 3D quality matching scores to the training set of particle images.

9. The method of claim 1, wherein the updating the training set of particle images includes:
   generating groups of like particle images; and
   providing the groups of like particle images to the training set of particle images.

10. The method of claim 1, further comprising retraining the artificial neural network using at least the updated training set.

11. The method of claim 10, further comprising using the retrained artificial neural network to extract a second subset of particle images from at least the plurality of particle images.

12. The method of claim 1 further comprising selecting the artificial neural network from a plurality of pre-trained artificial neural networks based on one of a priori information about the particle and settings of a transmission electron microscope used to obtain the plurality of particle images.

13. The method of claim 1, further comprising selecting the plurality of particle images using the at least partially trained artificial neural network from one or more micrographs.

14. The method of claim 13, wherein the acts of selecting the plurality of particle images and extracting the subset of particle images are performed concurrently by the at least partially trained artificial neural network.

15. The method of claim 1, wherein the updating the training set of particle images is initiated in response to the classification of the particle images or generation of the projections of the 3D reconstruction.

* * * * *